(12) United States Patent
Zhang (10) Patent No.: US 12,145,485 B2
(45) Date of Patent: Nov. 19, 2024

(54) CHILD SAFETY SEAT

(71) Applicant: Bambino Prezioso Switzerland AG, Steinhausen (CH)

(72) Inventor: Da Liang Zhang, Dongguan (CN)

(73) Assignee: Bambino Prezioso Switzerland AG, Steinhausen (CH)

(*) Notice: Subject to any disclaimer, the term of this patent is extended or adjusted under 35 U.S.C. 154(b) by 0 days.

(21) Appl. No.: 18/128,414

(22) Filed: Mar. 30, 2023

(65) Prior Publication Data

US 2023/0234481 A1   Jul. 27, 2023

Related U.S. Application Data

(63) Continuation of application No. 17/325,761, filed on May 20, 2021, now Pat. No. 11,639,121, which is a continuation of application No. 16/852,282, filed on Apr. 17, 2020, now Pat. No. 11,338,710.

(30) Foreign Application Priority Data

Apr. 26, 2019 (CN) .......................... 201910345902.1

(51) Int. Cl.
*B60N 2/28* (2006.01)

(52) U.S. Cl.
CPC ......... *B60N 2/2884* (2013.01); *B60N 2/2872* (2013.01)

(58) Field of Classification Search
CPC .............................. B60N 2/2884; B60N 2/2872
See application file for complete search history.

(56) References Cited

U.S. PATENT DOCUMENTS

2022/0126732 A1 * 4/2022 Zhang .................... B60N 2/919

FOREIGN PATENT DOCUMENTS

| CN | 207360133 U | | 5/2018 | |
|---|---|---|---|---|
| CN | 208498316 U | * | 2/2019 | ........... B60N 2/2872 |
| DE | 102016111608 A1 | * | 12/2017 | |
| EP | 3347233 B1 | | 7/2018 | |

OTHER PUBLICATIONS

EESR issued on Jan. 31, 2024 in European patent application No. 23177067.8.

* cited by examiner

*Primary Examiner* — Anthony D Barfield
(74) *Attorney, Agent, or Firm* — NZ CARR LAW OFFICE (57) ABSTRACT

A child safety seat includes a seat shell having at least one sidewall, a buffering part connected with the seat shell, the buffering part being movable between a first position corresponding to a stowed state where the buffering part is retracted toward the sidewall and a second position corresponding to a deployed state where the buffering part protrudes sideways from the sidewall, a retaining mechanism configured to hold the buffering part in the first position via a magnetic force, and a release mechanism operatively connected with the retaining mechanism, the release mechanism being operable to release the buffering part from the hold of the retaining mechanism for movement of the buffering part from the first position to the second position.

23 Claims, 11 Drawing Sheets

FIG. 11

CHILD SAFETY SEAT

CROSS-REFERENCE TO RELATED APPLICATION(S)

This application is a continuation application of U.S. patent application Ser. No. 17/325,761 filed on May 20, 2021, now granted as U.S. Pat. No. 11,639,121, which is a continuation application of U.S. patent application Ser. No. 16/852,282 filed on Apr. 17, 2020, now granted as U.S. Pat. No. 11,338,710, which claims priority to Chinese patent application no. 201910345902.1 filed on Apr. 26, 2019.

BACKGROUND

1. Field of the Invention

The present invention relates to child safety seats.

2. Description of the Related Art

A child safety seat is typically used in an automobile vehicle to properly restrain a child in the event of accidental collision. In particular, the child safety seat can provide protection by restraining the child from moving forward or rearward when the vehicle is subjected to frontal or rear collision.

In addition to providing protection during frontal and rear collision, some child safety seat may further include a side impact protection structure adapted to dissipate crash energy induced by vehicle side collision. For example, China patent no. CN 105329121 B describes a side impact protecting structure that is provided on a sidewall of the child safety seat, wherein the side impact protection structure includes a protecting element that can be retracted for storage or deployed for use, and a caregiver needs to apply a pressure on the protecting element to unlock the protecting element for deployment. Owing to the location of the protecting element on the sidewall of the child safety seat, it may happen that a caregiver forgets to deploy the protecting element, which consequently remains in a retracted position and cannot provide effective protection.

Therefore, there is a need for an improved child safety seat having a side impact protection system that can be conveniently deployed, and address at least the foregoing issues.

SUMMARY

The present application describes a child safety seat having a side impact protection system that is adapted to provide protection during vehicle side collision and can be stowed for compact storage and deployed in a convenient manner.

According to one aspect, the child safety seat includes a seat shell having at least one sidewall, a buffering part connected with the seat shell, the buffering part being movable between a first position corresponding to a stowed state where the buffering part is retracted toward the sidewall and a second position corresponding to a deployed state where the buffering part protrudes sideways from the sidewall, a retaining mechanism configured to hold the buffering part in the first position via a magnetic force, and a release mechanism operatively connected with the retaining mechanism, the release mechanism being operable to release the buffering part from the hold of the retaining mechanism for movement of the buffering part from the first position to the second position.

According to another aspect, the child safety seat includes a seat shell having at least one sidewall, a buffering part connected with the sidewall of the seat shell, the buffering part being movable between a first position corresponding to a stowed state where the buffering part is retracted toward the sidewall and a second position corresponding to a deployed state where the buffering part protrudes sideways from the sidewall, a retaining mechanism configured to hold the buffering part in the first position via a magnetic force, and a release mechanism operatively connected with the retaining mechanism, the release mechanism being operable to release the buffering part from the hold of the retaining mechanism by removing the magnetic force.

DETAILED DESCRIPTION OF THE EMBODIMENTS

Figure 1:
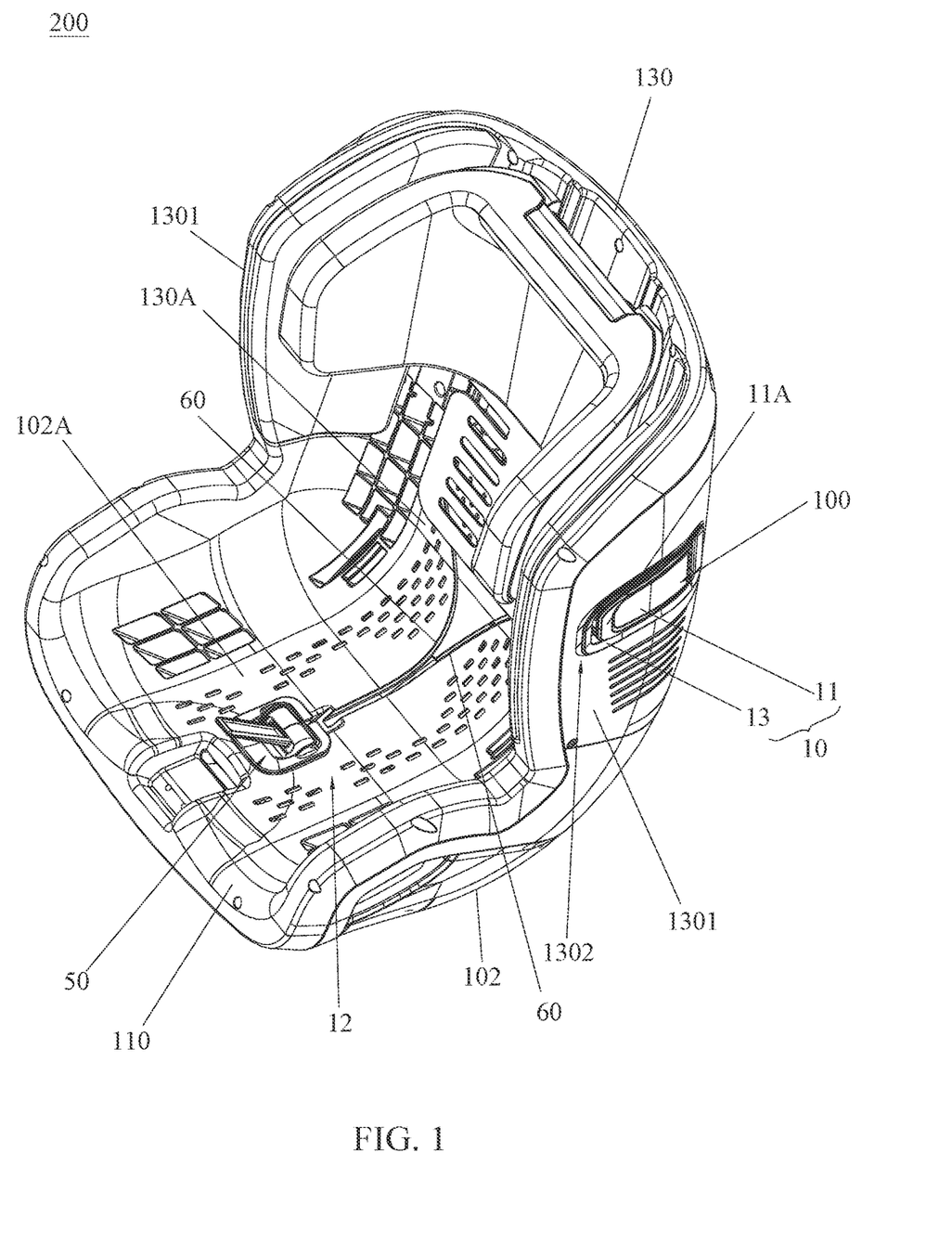
FIG. 1 is a perspective view illustrating an embodiment of a child safety seat having a side impact protection system in a stowed state.
Figure 2:
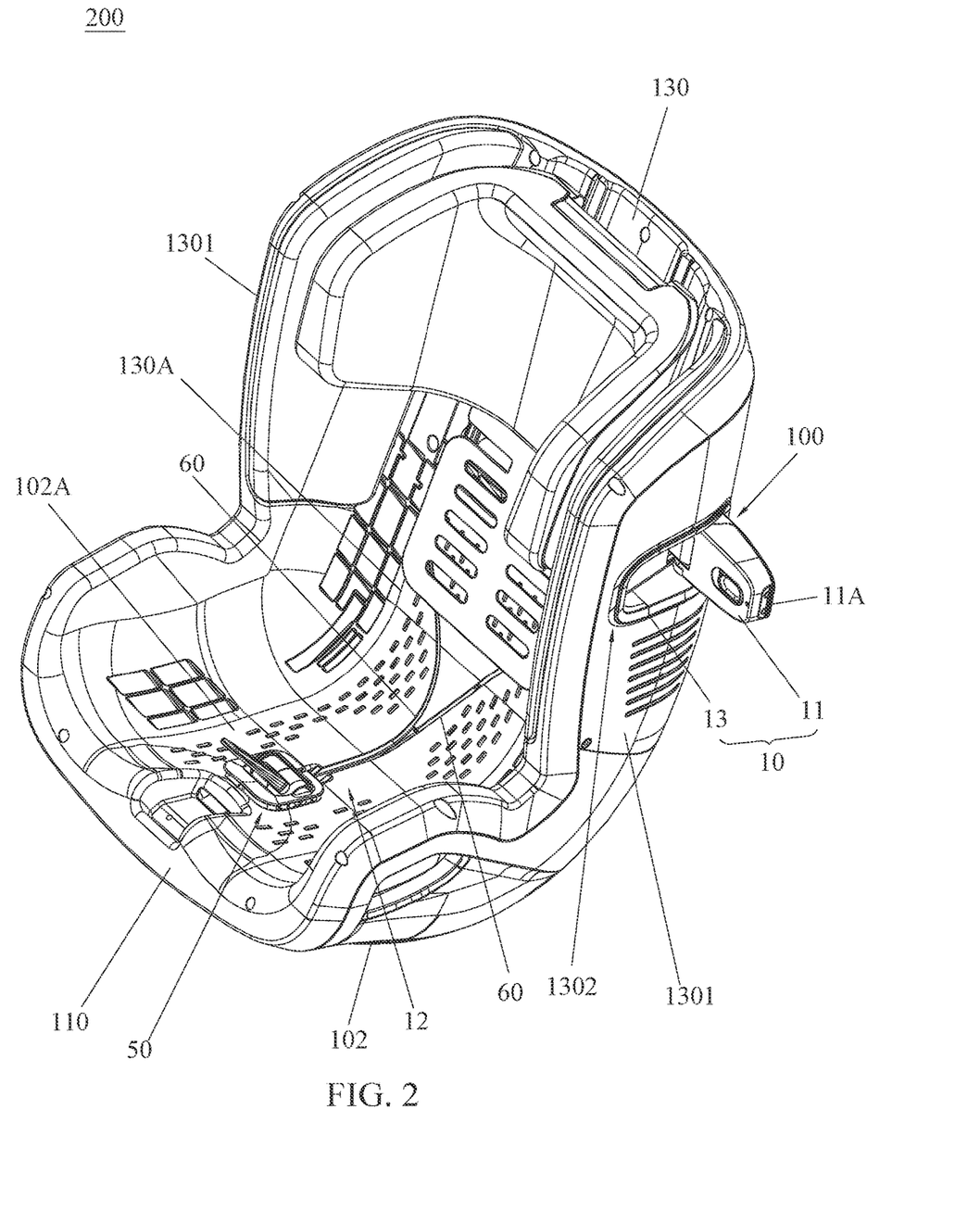
FIG. 2 is a perspective view illustrating the child safety seat with the side impact protection system in a deployed state.

FIGS. 1 and 2 are two perspective views illustrating an embodiment of a child safety seat 200. Referring to FIGS. 1 and 2, the child safety seat 200 includes a seat shell 102 including a seat portion 110 and a backrest portion 130, and a side impact protection system 100 coupled to the seat shell 102. The seat portion 110 and the backrest portion 130 can be fixedly connected with each other. For example, the seat shell 102 may be integrally formed to include the seat portion 110 and the backrest portion 130. The seat shell 102 can further include two sidewalls 1301 respectively provided at a left and a right side of the seat shell 102 for restricting sideways movements of a child sitting on the seat shell 102. The two sidewalls 1301 can be fixedly connected with the backrest portion 130, respectively project forward from the backrest portion 130 at the left and right sides of the seat shell 102, and extend from a top of the backrest portion 130 toward the seat portion 110.

Referring to FIGS. 1 and 2, the side impact protection system 100 can include an impact receiving module 10 and a retaining mechanism 20 (better shown in FIG. 9) coupled to each other at each of the left and right sides of the seat shell 102, and a release mechanism 12 respectively coupled to the retaining mechanism 20 at each of the left and right sides of the seat shell 102. The two impact receiving modules 10 respectively provided at the left and right sides of the seat shell 102 can have a same construction, and can be respectively disposed at symmetric positions on the two sidewalls 1301 of the backrest portion 130 (only one impact receiving module 10 is shown in FIGS. 1 and 2). Each impact receiving module 10 has a stowed state shown in FIG. 1 for facilitating its storage, and a deployed state for use shown in FIG. 2. The impact receiving module 10 can be held in the stowed state by the retaining mechanism 20 coupled thereto, and may be switched from the stowed state to the deployed state by operation of the release mechanism 12. When the vehicle in which is installed the child safety seat 200 is subjected to sideways collision, any of the impact receiving modules 10 in the deployed state can be pressed against the vehicle body (e.g., a vehicle door panel) for dissipating a portion of the impact energy. Sideways cushioning can be thereby achieved for better protection of the child sitting on the child safety seat 200.

Figure 3:
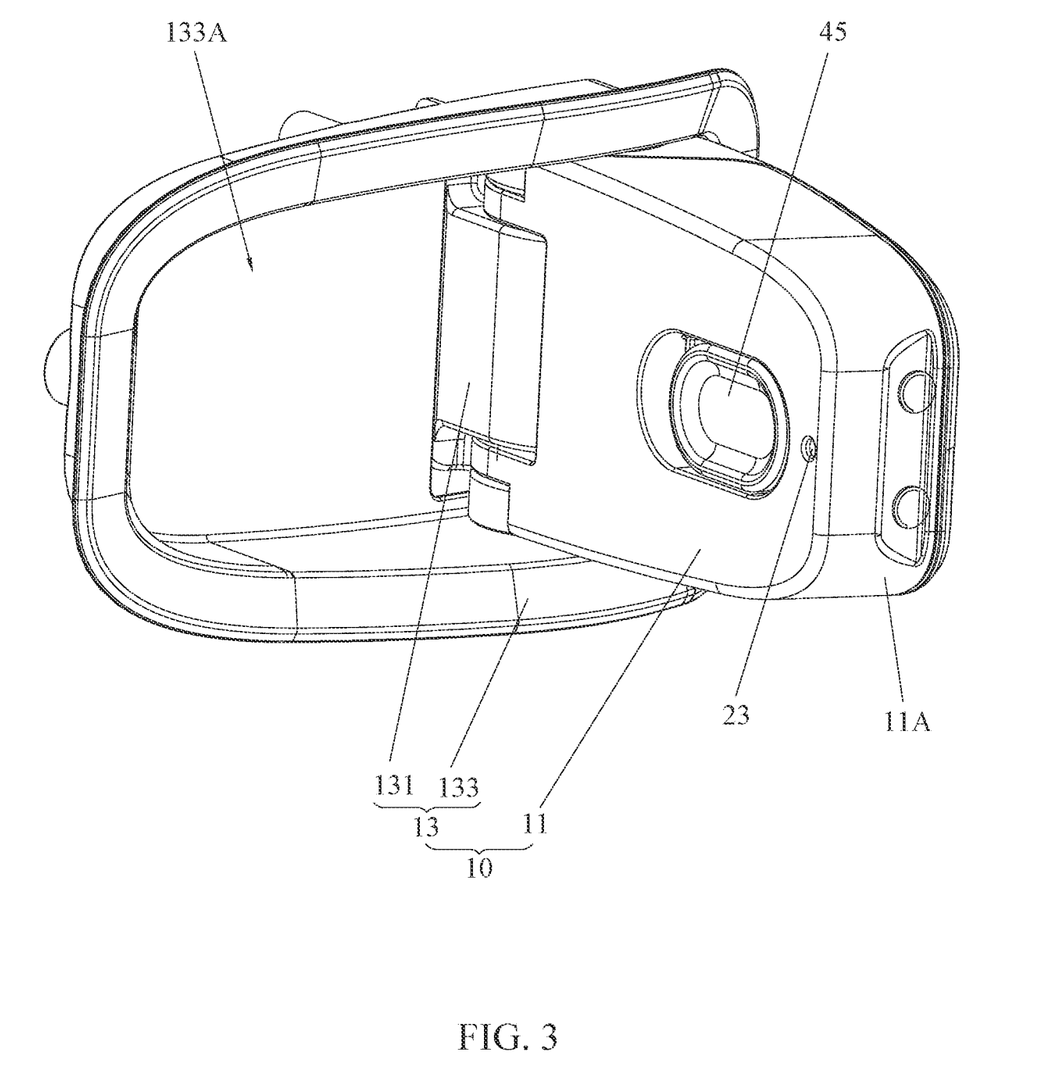
FIG. 3 is a perspective view illustrating an impact receiving module of the side impact protection system.

In conjunction with FIGS. 1 and 2, FIG. 3 is a perspective view illustrating one impact receiving module 10, and FIGS. 4-11 are various views illustrating further construction details of the side impact protection system 100. Referring to FIGS. 1-6, each sidewall 1301 can have an opening 1302 provided at an outer side thereof for receiving the assembly of the corresponding impact receiving module 10. The impact receiving module 10 includes a buffering part 11 that is movably connected with the seat shell 102. The buffering part 11 may have any suitable construction adapted to provide cushioning effects. According to an example of construction, the buffering part 11 may include two casing portions 113 and 115 that are fixedly attached to each other. Examples of suitable materials for making the buffering part 11 may include, without limitation, plastics. The buffering part 11 is movable relative to the seat shell 102 at the outer side of the sidewall 1301. For example, the buffering part 11 can move between a first position where a distal end 11A of the buffering part 11 is retracted toward the interior of the opening 1302, and a second position where the distal end 11A of the buffering part 11 protrudes sideways from the sidewall 1301 outside the opening 1302. The first position of the buffering part 11 corresponds to the stowed state shown in FIG. 1, and the second position of the buffering part 11 corresponds to the deployed state shown in FIG. 2. In the first position, the buffering part 11 may be substantially received inside the opening 1302 for compact storage. In the second position, the buffering part 11 may protrude outward, e.g., substantially perpendicular to the sidewall 1301. During sideways collision, the buffering part 11 in the second position may be pressed against a vehicle body (e.g., a vehicle door panel) and consequently deform, crush and/or cause a portion of the seat shell 102 around the buffering part 11 to deform for dissipating a portion of the impact energy.

According to an embodiment, the backrest portion 130 can have a front surface 130A adapted to provide support for a child's back, and the buffering part 11 may be connected with a portion of the sidewall 1301 that is located in front of the front surface 130A of the backrest portion 130. For example, the buffering part 11 may be connected with a portion of the sidewall 1301 that is located in front of the front surface 130A and is vertically adjacent to a child's seated shoulder height. With this placement, a pressure applied on the deployed buffering part 11 as a result of a sideways collision may cause the portion of the sidewall 1301 located in front of the front surface 130A of the backrest portion 130 to deform and bend toward the interior of the seat shell 102, which can provide better protection for the seated child.

According to an example of construction, the buffering part 11 may be pivotally connected with the seat shell 102. For example, a mount base 13 can be fixedly attached to the sidewall 1301 of the seat shell 102, and the buffering part 11 can be pivotally connected with the mount base 13. The buffering part 11 can thus rotate between the first position corresponding to the stowed state and the second position corresponding to the deployed state. According to an example of construction, the pivot connection of the buffering part 11 may be such that the distal end 11A of the buffering part 11 can be displaced forward to the first position and rearward to the second position.

Referring to FIGS. 3-6, the mount base 13 can exemplarily include a pivot support member 131 and a housing 133. The housing 133 can have a cavity 133A and can be fixedly connected with the seat shell 102 in the opening 1302 of the sidewall 1301. The pivot support member 131 can be fixedly connected with the seat shell 102 at an underside of the cavity 133A of the housing 133, and extend through an opening 1331 provided in the housing 133 into the cavity 133A. The portion of the pivot support member 131 extending into the cavity 133A of the housing 133 may have a hole 1311 (better shown in FIG. 6), and a pivot shaft (not shown) may be assembled through the hole 1311 for pivotally connecting the buffering part 11 with the pivot support member 131. The buffering part 11 thereby assembled can rotate relative to the pivot support member 131, wherein the buffering part 11 can be substantially received in the cavity 133A of the housing 133 in the first position and substantially protrude outside the cavity 133A of the housing 133 in the second position.

Figure 4:
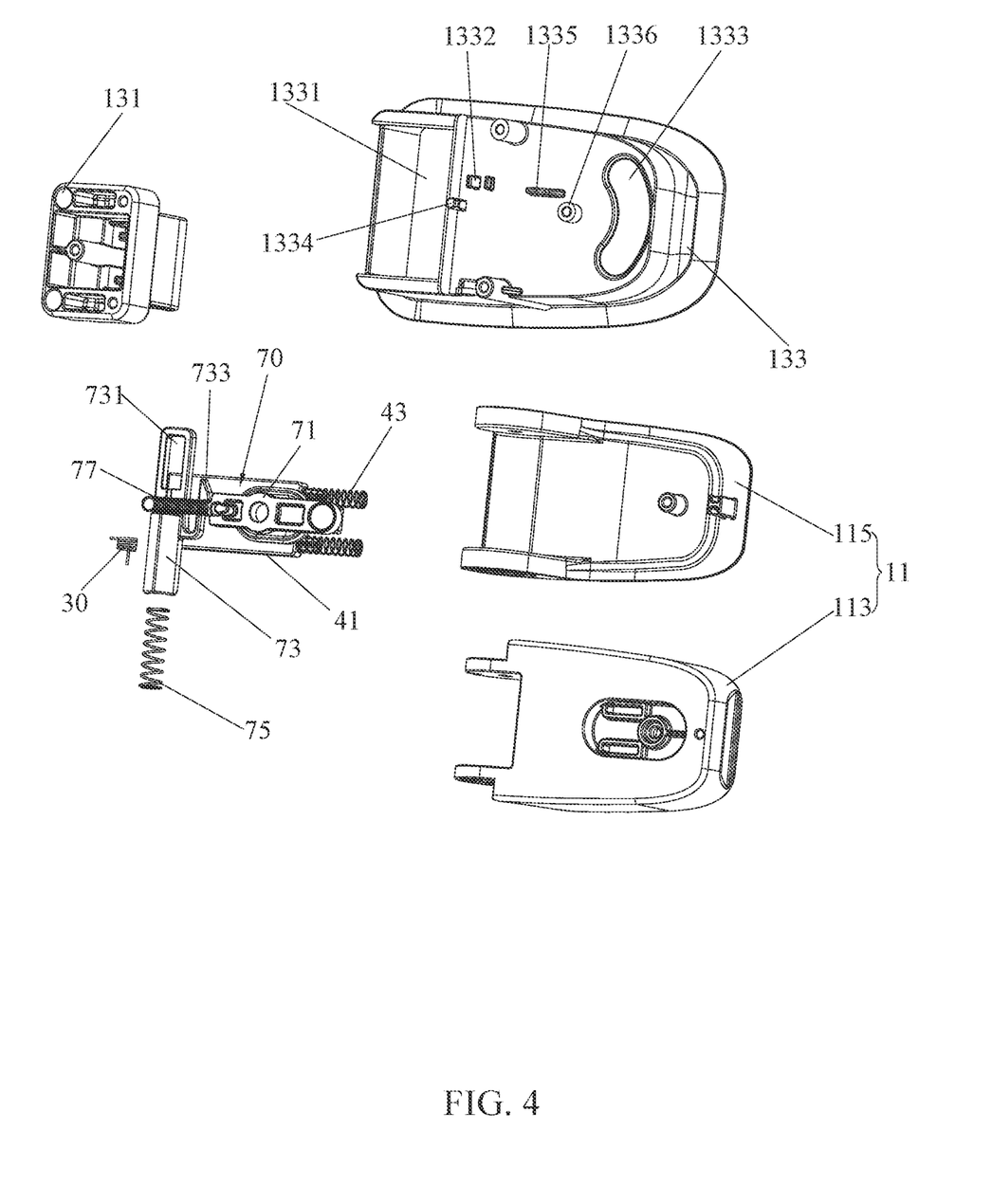
FIG. 4 is an exploded view illustrating some construction details of the side impact protection system.
Figure 6:
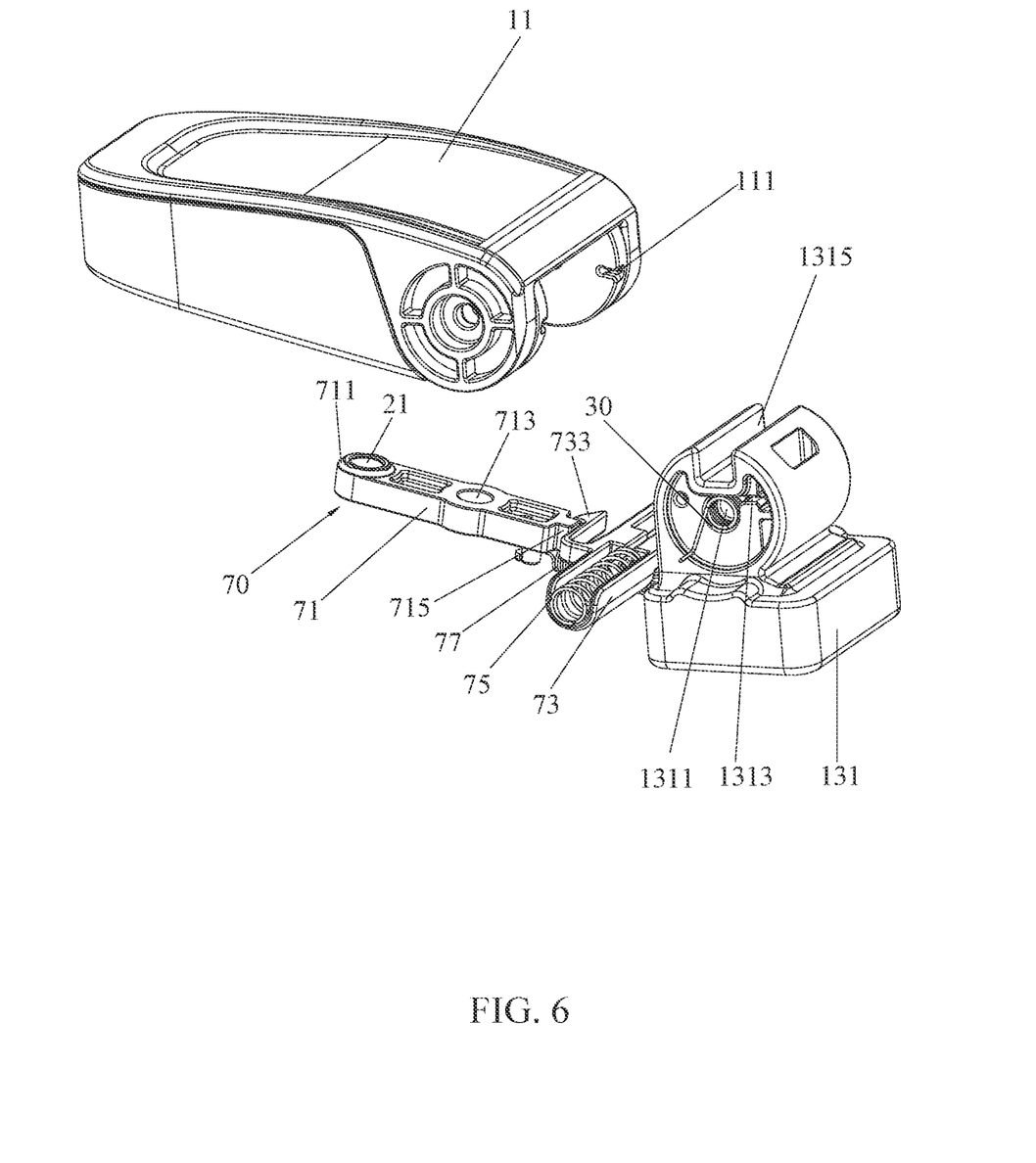
FIG. 6 is a partially exploded view illustrating some assembly details of the side impact protection system.

Referring to FIGS. 4 and 6, at each of the left and right sides, the child safety seat 200 may respectively include a spring 30 coupled to the buffering part 11. The spring 30 can bias the buffering part 11 toward the second position corresponding to the deployed state. According to an example of construction, the spring 30 may be a torsion spring. The spring 30 can be disposed inside the hole 1311 of the pivot support member 131, and can have two ends respectively anchored in a slot 1313 provided in the pivot support member 131 and a slot 111 provided in the buffering part 11. The biasing action applied by the spring 30 can facilitate deployment of the buffering part 11.

The two retaining mechanisms 20 respectively provided at the left and right sides of the seat shell 102 can be similar in construction, and are respectively disposed adjacent to the two impact receiving modules 10. FIGS. 3, 6, 8 and 9 illustrate construction details of one retaining mechanism 20. Referring to FIGS. 1, 3, 6, 8 and 9, each retaining mechanism 20 can be configured to hold the buffering part 11 associated therewith in the first position corresponding to the stowed state. According to an example of construction, the retaining mechanism 20 can include a magnetic element 21 coupled to the seat shell 102, and a magnetic element 23 coupled to the buffering part 11. For example, the magnetic element 21 may be disposed adjacent to the housing 133 of the mount base 13 on the seat shell 102, and the magnetic element 23 may be fixedly attached to the buffering part 11, whereby the magnetic element 23 can move along with the buffering part 11 relative to the seat shell 102 and the magnetic element 21. The two magnetic elements 21 and 23 can include magnets, electromagnets, ferromagnetic parts, magnetically sensitive parts, and like elements capable of interacting each other via magnetic attraction. For example, one of the two magnetic elements 21 and 23 may be a magnet, and the other one of the two magnetic elements 21 and 23 may be a part including iron or other ferromagnetic materials. When the buffering part 11 is in the first position corresponding to the stowed state, the two magnetic elements 21 and 23 are close to each other so that a holding force can be generated by magnetic attraction between the two magnetic elements 21 and 23 for holding the buffering part 11 in the first position. The magnetic element 23 can move away from the magnetic element 21 when the buffering part 11 moves from the first position to the second position.

Referring to FIGS. 1, 2 and 4-9, the release mechanism 12 includes an operating device 50 that is respectively connected operatively with the retaining mechanism 20 at each of the left and right sides of the seat shell 102, the operating device 50 being operable to release each buffering part 11 from the hold of the retaining mechanism 20 so that the buffering part 11 is allowed to move from the first position to the second position. For example, the release mechanism 12 may be configured to displace each magnetic element 21 relative to the seat shell 102 from a hold position (corresponding to the configuration shown in FIG. 7) to a release position (corresponding to the configuration shown in FIG. 8). When the magnetic element 21 is in the hold position and the buffering part 11 is in the first position, the two magnetic elements 21 and 23 are close to each other so that a holding force can be generated by magnetic attraction between the two magnetic elements 21 and 23 for holding the buffering part 11 in the first position. In the release position, the magnetic element 21 is displaced away from the magnetic element 23 to reduce or prevent the magnetic interaction between the magnetic elements 21 and 23, whereby the buffering part 11 is allowed to move from the first position to the second position. According to an example of construction, the release mechanism 12 can include the operating device 50, two actuators 70 (better shown in FIGS. 4 and 6-9), and two linking elements 60 respectively coupling the operating device 50 to the two actuators 70.

The two actuators 70 are respectively disposed adjacent to the two impact receiving modules 10, and can be similar in construction. FIGS. 4 and 6-9 illustrate construction details of one actuator 70 provided at one of the left and right sides of the seat shell 102. Referring to FIGS. 4 and 6-9, the actuator 70 is coupled to the magnetic element 21, and is operable to move the magnetic element 21 relative to the seat shell 102 between the hold position shown in FIG. 7 and the release position shown in FIG. 8. According to an example of construction, the actuator 70 can be connected with the seat shell 102, and can include a magnetic element carrier 71 and a spring 77. The magnetic element carrier 71 may be exemplarily a single part having a rod-like elongate shape. It will be appreciated, however, that the magnetic element carrier 71 may have other suitable shapes. The magnetic element carrier 71 can be fixedly connected with the magnetic element 21 and movably connected with the seat shell 102, whereby the magnetic element carrier 71 and the the magnetic element 21 carried thereon are movable in unison between the hold position and the release position.

Figure 7:
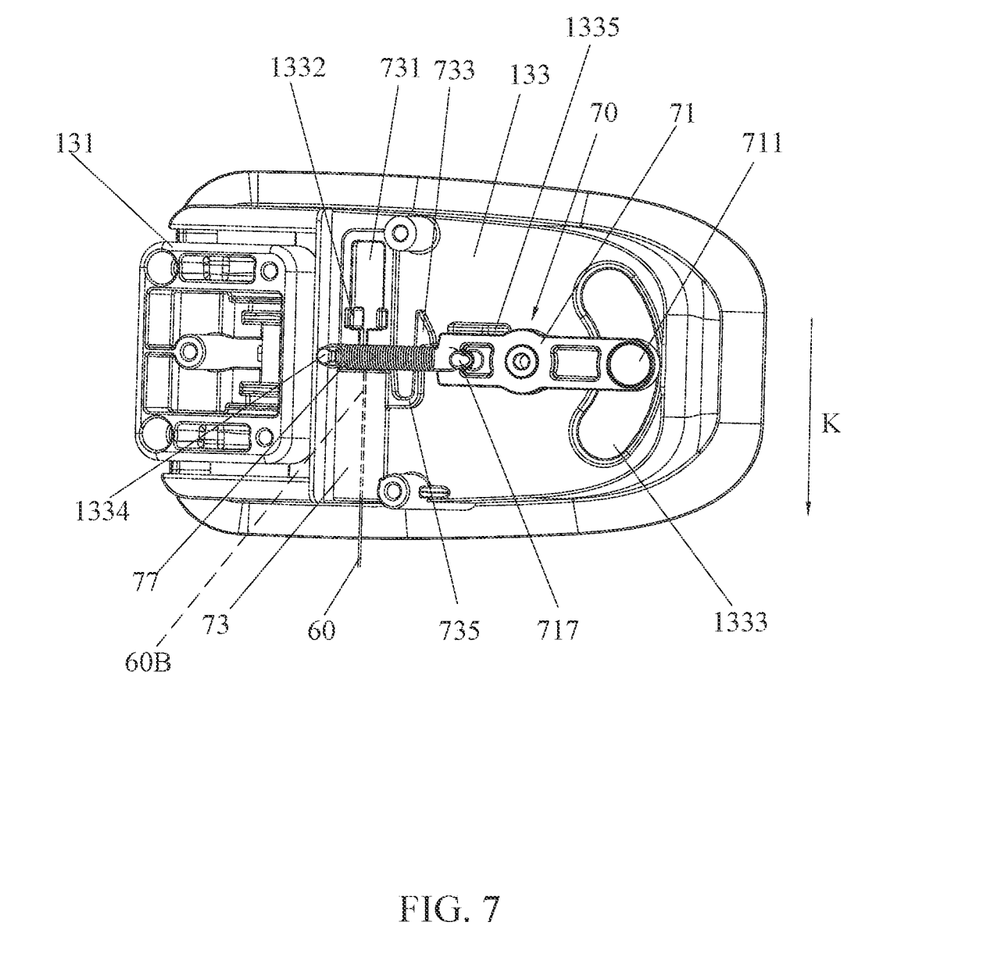
FIG. 7 is a schematic view illustrating some construction details of a retaining mechanism and a release mechanism of the side impact protection system.
Figure 8:
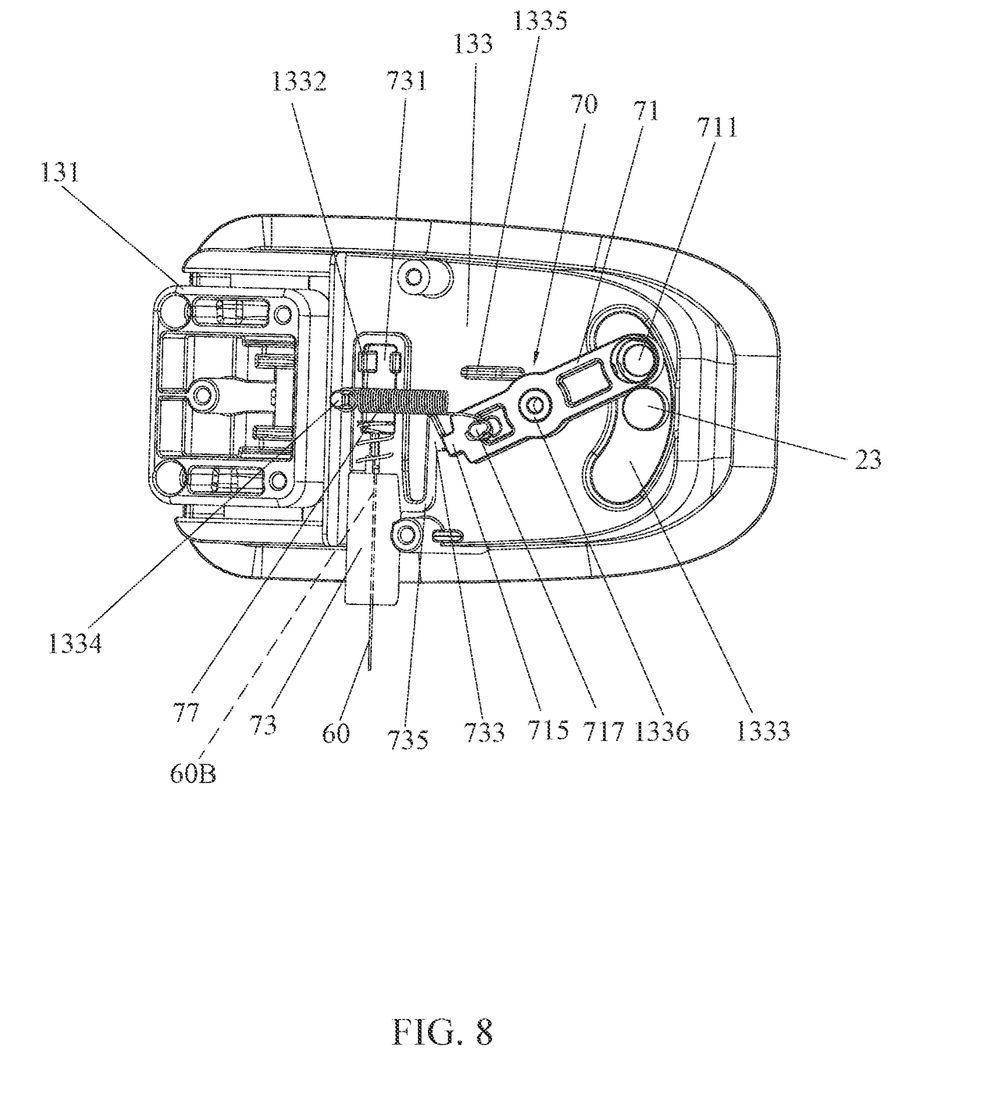
FIG. 8 is a schematic view illustrating the retaining mechanism in another configuration different from that of FIG. 7.

According to an example of construction, the magnetic element carrier 71 may be pivotally connected with the seat shell 102, and can rotate relative to the seat shell 102 between the hold position and the release position. For example, the magnetic element carrier 71 can have an opening 713, and a shaft portion 1336 fixedly connected with the housing 133 at a side opposite to that of the buffering part 11 can be disposed through the opening 713 for pivotally connecting the magnetic element carrier 71 about the shaft portion 1336. The buffering part 11 and the magnetic element carrier 71 can be thereby disposed at two opposite sides of the housing 133 for compact assembly. The magnetic element 21 can be fixedly attached to an end 711 of the magnetic element carrier 71 distant from the shaft portion 1336, and can be received at least partially in a recess 1333 of an arcuate shape provided in the housing 133. The recess 1333 may be exemplary provided on a side of the housing 133 opposite to that of the cavity 133A. As the magnetic element carrier 71 rotates about the shaft portion 1336, the magnetic element 21 can travel along the recess 1333.

Figure 9:
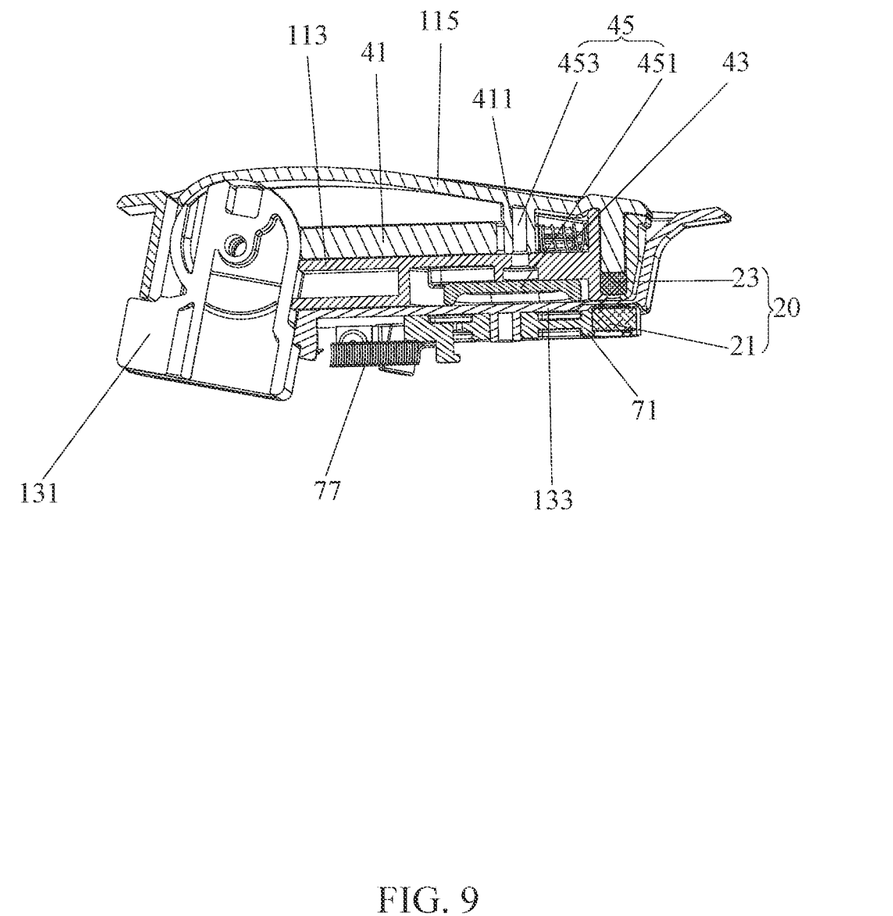
FIG. 9 is a cross-sectional view illustrating some construction details provided in the side impact protection system.

Referring to FIGS. 7-9, the spring 77 can be respectively connected with the seat shell 102 and the magnetic element carrier 71, and can bias the magnetic element carrier 71 toward the hold position. For example, the housing 133 affixed to the seat shell 102 can have a stud 1334, the magnetic element carrier 71 can have another stud 717, and the spring 77 can have two ends respectively connected with the two studs 1334 and 717. For ensuring that the magnetic element carrier 71 can suitably stop at the hold position, the housing 133 may be provided with a fixed rib 1335 adapted to limit the rotational course of the magnetic element carrier 71. When the magnetic element carrier 71 biased by the spring 77 rotates and reaches the hold position, the magnetic element carrier 71 can contact with the fixed rib 1335, which can stop the magnetic element carrier 71 in the hold position.

Referring to FIGS. 1, 2, 7, 8, 10 and 11, the operating device 50 is assembled with the seat shell 102 at a location distant from the two actuators 70, and can be respectively connected with the two actuators 70 via the two linking elements 60. According to an example of construction, the operating device 50 can be disposed in the seat portion 110 of the seat shell 102, e.g., adjacent to a thigh region of the seat shell 102. The linking elements 60 can be flexible elements, which may exemplarily include wires, cables, cords and the like. Each linking element 60 may have an end 60A (better shown in FIG. 11) anchored to the operating device 50, and another end 60B (better shown in FIGS. 7 and 8) operatively connected with the corresponding magnetic element carrier 71. The operating device 50 is thereby operable to cause the two magnetic element carriers 71 and the magnetic elements 21 carried thereon to respectively move in parallel from the hold position to the release position for releasing the two buffering parts 11.

Various constructions may be suitable for operatively connecting the end 60B of each linking element 60 with the corresponding magnetic element carrier 71. According to an example of construction, the end 60B of the linking element 60 can be anchored to a driving part 73 that is disposed adjacent to the magnetic element carrier 71. The driving part 73 can be slidably assembled with the seat shell 102, and can contact with the magnetic element carrier 71. For example, the driving part 73 may have a guide slot 731, and the housing 133 affixed to the seat shell 102 can have one or more protruding ribs 1332 in sliding contact with the guide slot 731. The driving part 73 can thereby slide relative to the seat shell 102 in a direction K to contact and urge the magnetic element carrier 71 to rotate from the hold position to the release position.

Moreover, a spring 75 can be respectively connected with the driving part 73 and the seat shell 102, and can bias the driving part 73 to slide in a direction opposite to the direction K. With this construction, the operating device 50 can be actuated to exert a pulling force through each linking element 60, which causes the driving part 73 thereof to slide in the direction K and urge the magnetic element carrier 71 to rotate from the hold position to the release position. When the operating device 50 is released and no pulling force is exerted through each linking element 60, the driving part 73 can recover an initial position owing to the biasing force applied by the spring 75, and the magnetic element carrier 71 can rotate from the release position to the hold position owing to the biasing force applied by the spring 77.

According to an example of construction, the interaction between the magnetic element carrier 71 and the driving part 73 may be achieved via a contact between a flange 715 provided on the magnetic element carrier 71 and an end 733 of a bent arm 735 that is attached to the driving part 73. For example, the end 733 of the bent arm 735 can contact and urge the magnetic element carrier 71 to rotate from the hold position to the release position when the driving part 73 pulled by the linking element 60 slides in the direction K. The bent arm 735 can be elastically deformable, which may facilitate movement of the magnetic element carrier 71 toward the hold position under the biasing force of the spring 77.

The driving part 73 is provided for facilitating driving of the magnetic element carrier 71. It will be appreciated, however, that other constructions may be possible. For example, a variant construction may omit the driving part 73 and the spring 75 and directly anchor the end 60B of the linking element 60 to the magnetic element carrier 71, whereby the operating device 50 can be actuated to exert a pulling force through the linking element 60 that urges the magnetic element carrier 71 to rotate from the hold position to the release position.

Figure 10:
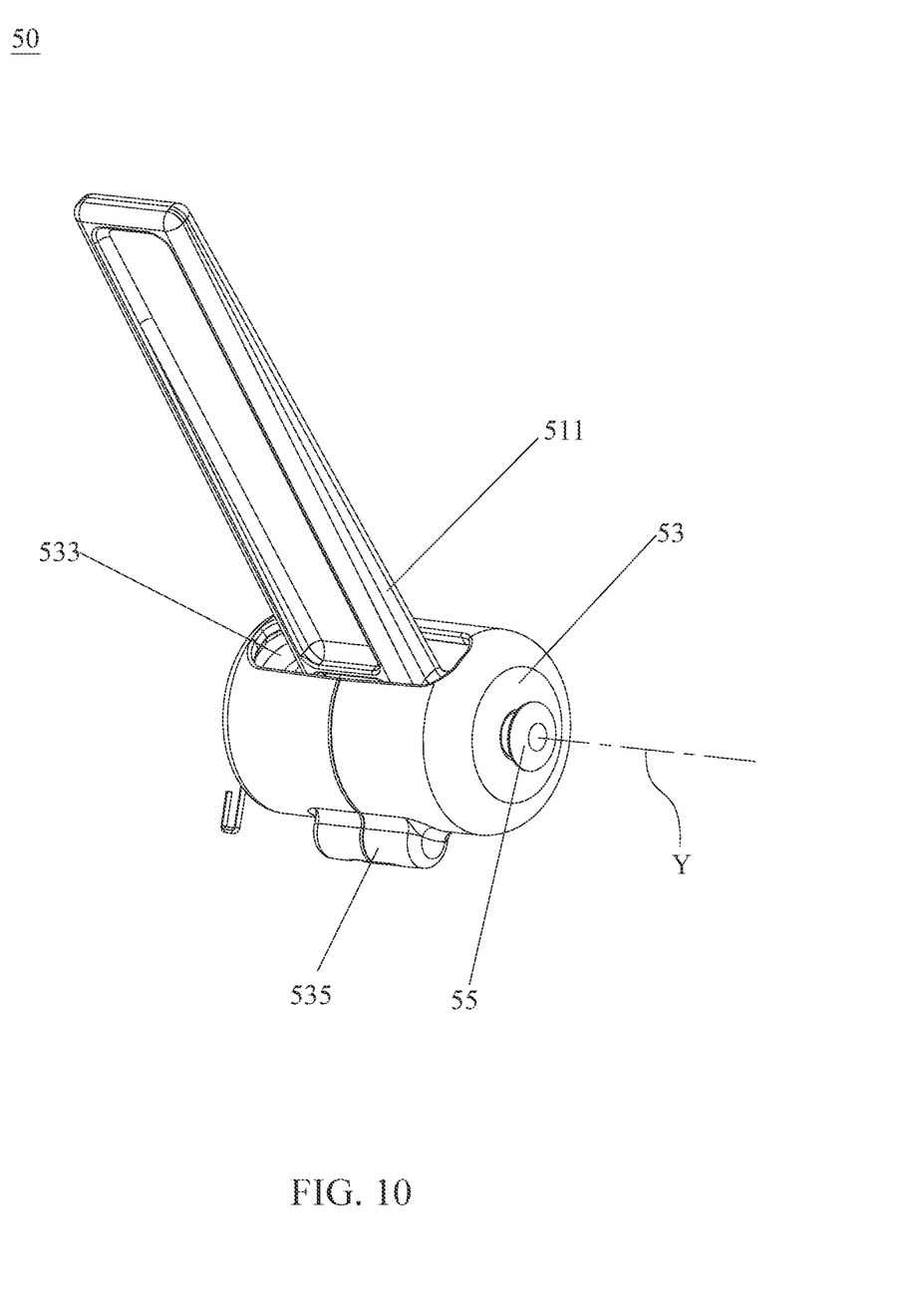
FIG. 10 is a perspective view illustrating an operating device provided in the release mechanism of the side impact protection system.
Figure 11:
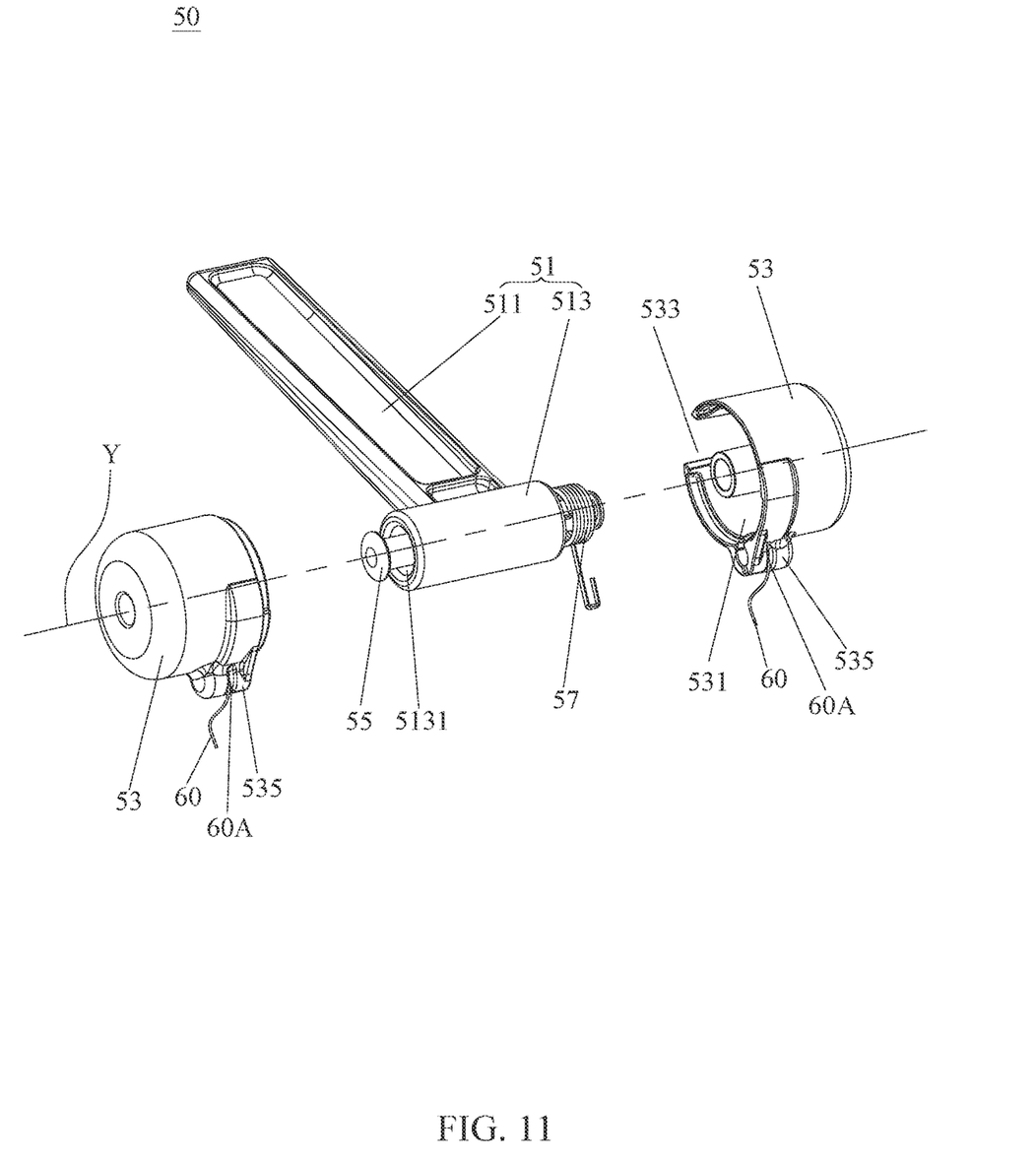
FIG. 11 is an exploded view illustrating some construction details of the operating device.

Referring to FIGS. 1, 10 and 11, the operating device 50 can include an actuating part 51, two coupling parts 53, a shaft 55 and a spring 57. The two coupling parts 53 can be pivotally connected with the seat shell 102 about a same pivot axis Y extending transversally from a left side to a right side of the seat shell 102, and can be respectively connected with the ends 60A of the two linking elements 60. According to an example of construction, each coupling part 53 can be a casing portion having a generally cylindrical shape, and can be provided with an anchoring portion 535 protruding from an outer periphery thereof. The end 60A of the linking element 60 can be attached to the anchoring portion 535 of the coupling part 53.

The actuating part 51 can be assembled with the two coupling parts 53, and can rotate along with the two coupling parts 53 about the pivot pivot axis Y relative to the seat shell 102 for exerting a pulling force through the two linking elements 60. According to an example of construction, the actuating part 51 can include a rod portion 511 and a mount portion 513 fixedly connected with each other. The actuating part 51 including the rod portion 511 and the mount portion 513 may be formed integrally as a single part. The mount portion 513 of the actuating part 51 can be disposed in a cavity 531 defined at least partially by the two coupling parts 53, and the rod portion 511 can protrude outward through an opening 533 provided in the two coupling parts 53. Moreover, the mount portion 513 disposed in the inner cavity 531 is pivotally connected with the two coupling parts 53 about the pivot axis Y, whereby a relative rotation between the actuating part 51 and the two coupling parts 513 is allowed.

For example, the mount portion 513 can have a hole 5131, and the shaft 55 can be disposed through the two coupling parts 53 and the hole 5131 of the mount portion 513 so that the actuating part 51 is pivotally connected with the two coupling parts 53. The relative rotation between the actuating part 51 and the two coupling parts 53 can be defined, e.g., by a course of the rod portion 511 between two opposite edges of the opening 533. With this assembly, the actuating part 51 can be pivotally connected with the seat shell 102 via the coupling parts 53, and can rotate to raise or lower the rod portion 511 with respect to a surface 102A of the seat shell 102 in the thigh region.

The spring 57 can be disposed around the pivot axis Y, and can have two opposite ends respectively connected with the actuating part 51 and the seat shell 102. According to an example of construction, the spring 57 may be a torsion spring. The spring 57 can bias the actuating part 51 to rotate for raising the rod portion 511 with respect to the surface 102A of the seat shell 102.

With the aforementioned construction of the operating device 50, a rotation of the actuating part 51 that moves the rod portion 511 toward the surface 102A of the seat shell 102 can drive the two coupling parts 53 to rotate in unison in the same direction, which can respectively pull the two linking elements 60 and cause the driving parts 73 attached thereto to respectively move and urge the magnetic element carriers 71 to rotate from the hold position to the release position. When no external force is applied on the operating device 50, the spring 57 can urge the actuating part 51 to rotate for raising the rod portion 511 from the surface 102A of the seat shell 102, whereby the pulling force exerted by the actuating part 51 and the coupling parts 53 on the linking elements 60 can be removed and each magnetic element carrier 71 can rotate from the release position to the hold position under the biasing force of the spring 77.

Figure 5:
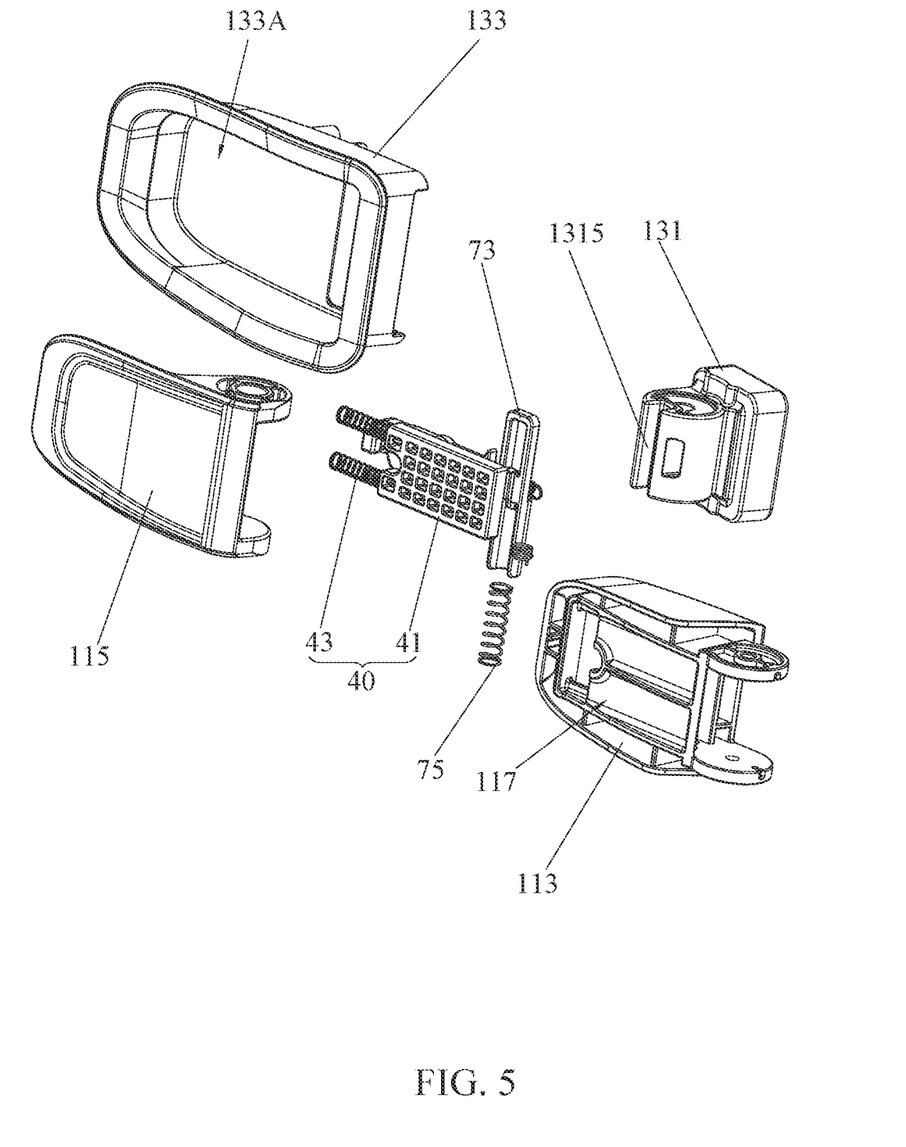
FIG. 5 is an exploded view taken from a side opposite to that of FIG. 4.

Referring to FIGS. 3, 5 and 9, each of the two buffering parts 11 can be respectively provided with a latching mechanism 40 operable to lock the buffering part 11 in the second position corresponding to the deployed state. The latching mechanism 40 can be received in a cavity 117 at least partially defined by the two casing portions 113 and 115 of the buffering part 11, and can include a latch 41, a spring 43 and a release actuating part 45.

The latch 41 can move between a locking state where the latch 41 is engaged with the pivot support member 131 to lock the buffering part 11 in the second position corresponding to the deployed state, and an unlocking state where the latch 41 is disengaged from the pivot support member 131 for unlocking the buffering part 11 so that the buffering part 11 can rotate relative to the seat shell 102. According to an example of construction, the latch 41 can be slidably connected with the buffering part 11, and can slide to engage with or disengage from a notch 1315 (better shown in FIG. 6) provided on the pivot support member 131. The latch 41 is engaged with the notch 1315 of the pivot support member 131 in the locking state and disengaged from the notch 1315 of the pivot support member 131 in the unlocking state.

The spring 43 can have two ends respectively connected with the latch 41 and an inner sidewall of the cavity 117, and can bias the latch 41 toward the locking state for engaging with the pivot support member 131.

The release actuating part 45 is operable to urge the latch 41 to move from the locking state to the unlocking state. According to an example of construction, the release actuating part 45 can be fixedly connected with the latch 41 and exposed for operation on the buffering part 11. For example, the release actuating part 45 can include an operating portion 451 and a mount portion 453 fixedly connected with each other, the operating portion 451 being exposed outside the buffering part 11 for operation, and the mount portion 453 being fixedly attached in an opening 411 (better shown in FIG. 9) provided in the latch 41. The release actuating part 45 can thereby slide along with the latch 41 between the locking state and the unlocking state.

Exemplary operation of the side impact protection system 100 is described hereinafter with reference to FIGS. 1-11. When the child safety seat 200 is unused and has no child placed thereon, each buffering part 11 can be stowed in the first position for convenient storage, and the magnetic element carrier 71 biased by the spring 77 can be in the hold position so that the magnetic interaction between the two magnetic elements 21 and 23 of the retaining mechanism 20 can hold the buffering part 11 in the first position. Moreover, the biasing force applied by the spring 57 can keep the actuating part 51 of the operating device 50 in position with the rod portion 511 thereof rising at an angle with respect to the surface 102A of the seat shell 102.

When a child is installed on the child safety seat 200, the actuating part 51 and the two coupling parts 53 can be urged to rotate in unison in the same direction (e.g., via a manual operation of a caregiver or a contact with the child that pushes the rod portion 511 of the actuating part 51 toward the surface 102A of the seat shell 102), which can respectively pull the two linking elements 60 and cause the driving parts 73 attached thereto to respectively move and urge the magnetic element carriers 71 to rotate from the hold position to the release position. As a result, each buffering part 11 can be released from the hold of the retaining mechanism 20 and can rotate under the biasing force of the spring 30 from the first position corresponding to the stowed state to the second position corresponding to the deployed state. Once the buffering part 11 reaches the second position, the biasing force of the spring 43 can urge the latch 41 to move and engage with the notch 1315 of the pivot support member 131 for locking the buffering part 11 in the second position.

For stowing the buffering part 11, the actuating part 51 can be rotated in a direction that raises the rod portion 511 from the surface 102A of the seat shell 102, whereby the pulling force exerted by the actuating part 51 and the coupling parts 53 on the linking elements 60 can be removed and each magnetic element carrier 71 can rotate from the release position to the hold position under the biasing force of the spring 77. This rotation of the actuating part 51 may be driven by the biasing force of the spring 57 after the child is first removed from the child safety seat 200. Then the caregiver can operate the release actuating part 45 of the latching mechanism 40 so that the latch 41 is urged to slide and disengage from the notch 1315 of the pivot support member 131. The buffering part 11 is thereby unlocked, and then can be rotated from the second position to the first position. Once the buffering part 11 is stowed in the first position, the holding force applied by the retaining mechanism 20 can hold the buffering part 11 in position.

The aforementioned construction can deploy the buffering parts 11 in a convenient manner. For example, the deployment of the two buffering parts 11 may be triggered by the placement of a child on the child safety seat 200 without requiring a caregiver to perform a manual unlocking step. Accordingly, it can be ensured that the buffering parts 11 are properly deployed for providing protection as soon as a child is installed on the child safety seat 200.

According to a variant embodiment, the operating device 50 and the linking elements 60 may be omitted, the remaining structure being similar to the previous embodiment. In this variant embodiment, each buffering part 11 can be likewise stowed in the first position when the child safety seat 200 is unused, wherein the magnetic interaction between the two magnetic elements 21 and 23 can hold the buffering part 11 in the first position like previously described. When sideways collision occurs, the collision energy can cause a relative movement between the two magnetic elements 21 and 23 of at least one retaining mechanism 20 so that the corresponding buffering part 11 can deploy to the second position under the biasing force of the spring 30. For example, the collision energy can cause the magnetic element carrier 71 and the magnetic element 21 thereon to move relative to the seat shell 102 from the hold position to the release position for releasing the buffering part 11 from the hold of the retaining mechanism 20, and the buffering part 11 can then deploy to the second position under the biasing force of the spring 30. Accordingly, the construction of the retaining mechanism 20 comprised of the two magnetic elements 21 and 23 may facilitate deployment of the buffering part 11 without requiring a caregiver's intervention.

According to another variant embodiment, the operating device 50, the linking elements 60, the magnetic element carrier 71 and the spring 77 can be omitted, and the magnetic element 21 may be fixedly connected with the seat shell 102. In this other variant embodiment, each buffering part 11 can be likewise stowed in the first position when the child safety seat 200 is unused, wherein the magnetic interaction between the two magnetic elements 21 and 23 close to each other can hold the buffering part 11 in the first position like previously described. When sideways collision occurs, the collision energy can force the buffering part 11 to move relative to the seat shell 102 against the magnetic attraction between the two magnetic elements 21 and 23 and thereby deploy outward to the second position for providing protection.

Advantages of the child safety seat described herein include the ability to provide a side impact protection system that can be stowed for compact storage. Moreover, the side impact protection system can be easily deployed in use, which can provide suitable protection during vehicle side collision.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
a seat shell having at least one sidewall;
a buffering part connected with the seat shell and having a distal end, the buffering part being movable between a first position corresponding to a stowed state where the distal end of the buffering part is retracted toward the sidewall and stored in an opening provided in the sidewall, and a second position corresponding to a deployed state where the distal end of the buffering part protrudes sideways from the sidewall outside the opening;
a retaining mechanism configured to hold the buffering part in the first position via a magnetic force;
a release mechanism operatively connected with the retaining mechanism, the release mechanism being operable to release the buffering part from the hold of the retaining mechanism for movement of the buffering part from the first position to the second position; and a spring coupled to the buffering part, the spring biasing the buffering part toward the second position.

2. The child safety seat according to claim 1, wherein the retaining mechanism includes a first magnetic element coupled to the seat shell and a second magnetic element coupled to the buffering part, magnetic attraction being generated between the first and second magnetic elements for holding the buffering part in the first position when the first and second magnetic elements are close to each other.

3. The child safety seat according to claim 2, wherein the release mechanism includes an actuator movable to displace the first magnetic element relative to the seat shell.

4. The child safety seat according to claim 3, wherein the actuator has a hold position corresponding to a placement of the first magnetic element close to the second magnetic element, and a release position corresponding to a placement of the first magnetic element away from the second magnetic element, and the release mechanism further includes an operating device operable to urge the actuator to move from the hold position to the release position.

5. The child safety seat according to claim 4, wherein the actuator is biased toward the hold position.

6. The child safety seat according to claim 4, wherein the operating device is coupled to the actuator via a flexible linking element.

7. The child safety seat according to claim 6, wherein the operating device includes an actuating part and a coupling part assembled with each other and pivotally connected with the seat shell, the linking element having an end anchored to the coupling part, the actuating part being rotatable along with the coupling part relative to the seat shell for exerting a pulling force through the linking element.

8. The child safety seat according to claim 7, wherein the actuating part is pivotally connected with the coupling part.

9. The child safety seat according to claim 7, wherein the actuating part includes a rod portion, the actuating part being rotatable to raise or lower the rod portion with respect to a surface of the seat shell.

10. The child safety seat according to claim 9, wherein the operating device further includes another spring connected with the actuating part, the other spring biasing the actuating part for raising the rod portion with respect to the surface of the seat shell.

11. The child safety seat according to claim 4, wherein the actuator includes a magnetic element carrier, the magnetic element carrier being fixedly connected with the first magnetic element and movably connected with the seat shell, whereby the magnetic element carrier and the first magnetic element are movable between the hold position and the release position.

12. The child safety seat according to claim 11, wherein the actuator further includes another spring connected with the magnetic element carrier, the other spring being adapted to bias the magnetic element carrier toward the hold position.

13. The child safety seat according to claim 11, wherein the release mechanism further includes a flexible linking element having a first end and a second end, the first end of the linking element being anchored to the operating device, and the second end of the linking element being operatively connected with the magnetic element carrier.

14. The child safety seat according to claim 13, wherein the second end of the linking element is anchored to a driving part that is adapted to contact with the magnetic element carrier, the driving part being slidably assembled with the seat shell.

15. The child safety seat according to claim 1, wherein the buffering part is provided with a latching mechanism operable to lock the buffering part in the second position.

16. A child safety seat comprising:
a seat shell having at least one sidewall;
a buffering part connected with the sidewall of the seat shell and having a distal end, the buffering part being movable between a first position corresponding to a stowed state where the distal end of the buffering part is retracted toward the sidewall and stored in an opening provided in the sidewall, and a second position corresponding to a deployed state where the distal end of the buffering part protrudes sideways from the sidewall outside the opening;
a retaining mechanism configured to hold the buffering part in the first position via a magnetic force;
a release mechanism operatively connected with the retaining mechanism, the release mechanism being operable to release the buffering part from the hold of the retaining mechanism by removing the magnetic force; and
a spring coupled to the buffering part, the spring biasing the buffering part toward the second position.

17. The child safety seat according to claim 16, wherein the retaining mechanism includes a first magnetic element coupled to the seat shell and a second magnetic element coupled to the buffering part, magnetic attraction being generated between the first and second magnetic elements for holding the buffering part in the first position when the first and second magnetic elements are close to each other.

18. The child safety seat according to claim 17, wherein the release mechanism includes an actuator movable to displace the first magnetic element relative to the second magnetic element, the first magnetic element being displaced away from the second magnetic element for removing the magnetic force.

19. The child safety seat according to claim 18, wherein the actuator has a hold position corresponding to a placement of the first magnetic element close to the second magnetic element, and a release position corresponding to a placement of the first magnetic element away from the second magnetic element, and the release mechanism further includes an operating device operable to urge the actuator to move from the hold position to the release position.

20. The child safety seat according to claim 19, wherein the actuator includes a magnetic element carrier, the magnetic element carrier being fixedly connected with the first magnetic element and movably connected with the seat shell, whereby the magnetic element carrier and the first magnetic element are movable between the hold position and the release position.

21. The child safety seat according to claim 20, wherein the release mechanism further includes a flexible linking element having a first end and a second end, the first end of the linking element being anchored to the operating device, and the second end of the linking element being operatively connected with the magnetic element carrier.

22. The child safety seat according to claim 21, wherein the second end of the linking element is anchored to a driving part that is adapted to contact with the magnetic element carrier, the driving part being slidably assembled with the seat shell.

23. The child safety seat according to claim 16, wherein the buffering part is provided with a latching mechanism operable to lock the buffering part in the second position.

\* \* \* \* \*